United States Patent [19]

Nishida et al.

[11] Patent Number: 4,627,283

[45] Date of Patent: Dec. 9, 1986

[54] FUEL LEVEL DETECTOR FOR AUTOMOBILE FUEL TANK

[75] Inventors: Katsuhiko Nishida, Toyota; Tokio Naruse; Hiroshi Shibata, both of Chiryu, all of Japan

[73] Assignee: Tsuchiya Co., Ltd., Nagoya, Japan

[21] Appl. No.: 791,711

[22] Filed: Oct. 28, 1985

[30] Foreign Application Priority Data

Aug. 13, 1985 [JP] Japan .................. 60-123589[U]

[51] Int. Cl.$^4$ .................. G01F 23/62; H01H 35/18
[52] U.S. Cl. .................. 73/313; 73/308; 200/84 C; 335/206; 340/624
[58] Field of Search .................. 73/313, 308, 113; 335/206

[56] References Cited

U.S. PATENT DOCUMENTS

| | | | |
|---|---|---|---|
| 3,976,963 | 8/1976 | Kubler | 73/313 X |
| 4,086,812 | 5/1978 | Luthe et al. | 73/313 X |
| 4,184,370 | 1/1980 | Schlick et al. | 73/313 |
| 4,305,283 | 12/1981 | Redding | 73/313 X |
| 4,536,660 | 8/1985 | Tetro | 200/84 C X |

FOREIGN PATENT DOCUMENTS 56-70521 6/1981 Japan .
57-29819 2/1982 Japan .

Primary Examiner—Daniel M. Yasich
Attorney, Agent, or Firm—Harness, Dickey & Pierce

[57] ABSTRACT

A fuel level detector for an automobile fuel tank comprises a strut vertically provided within a fuel tank, a float slidably fitted around the strut and having a permanent magnet therein, a plurality of magnetic induction type reed switches slantedly disposed along the strut with a adequate distance between the adjacent reed switches, the length of which distance being defined such that the permanent magnet of the float always actuates two adjacent reed switches simultaneously, a plurality of resistances respectively connected to the plurality of reed switches for changing current value according to the reed switches which are actuated, a residual quantity warning means having an element of a luminous body which is connected between a ground and a predetermined reed switch among the plurality of reed switches, and a distance retention mechanism for keeping constant a distance between the predetermined reed switch and the bottom surface of the fuel tank and having a guide mounted to a base member for vertically guiding the strut and a spring mounted between the base member and the strut for urging the strut towards the bottom surface of the fuel tank.

4 Claims, 10 Drawing Figures

FUEL LEVEL DETECTOR FOR AUTOMOBILE FUEL TANK

FIELD OF THE INVENTION AND RELATED ART STATEMENT

The present invention relates to fuel level detector for measuring a quantity of fuel remaining in an automobile fuel tank.

Hitherto, fuel level detectors for automobile fuel tanks which have been in common use are float arm type variable resistance units. One example of which is shown in FIG. 8. This conventional unit is constructed such that movement of a float 21 that follows vertical change of fuel level is transmitted via float arm 22 to a contact lever 23. A contact 24 attached to the contact lever 23 is caused to slide, as the contact lever moves, on a resistor body 25 of a winding or thick film type, so that a resistance value may be changed. For the purpose of warning a driver that his residual fuel quantity has decreased, a residual quantity detector 26 is mounted to a supporting rod 27 as shown in FIG. 8. In order to maintain a distance between the detector 26 and the bottom surface of the tank in constant without being influenced by possible expansion and contraction of the fuel tanks, the supporting rod 27 having a wheel 28 mounted thereto is connected through spring means (not shown) to a fuel tank mounting base 29. As is apparent, the fuel level detector for the fuel tank which incorporates the float arm type variable resistance unit usually has an intricate structure having associated therein various kinds of mechanisms.

Owing to the fact that, as is shown in FIG. 9, the afore-said float arm type variable resistance unit has a contact type detecting construction which is designed to electrically detect resistance value change occurring through the sliding contact between the resistor and lever contact, there is a trend that its detecting accuracy can be deteriorated by deviation in production, decrease in contact pressure due to the wear at the sliding contact part, increase in contact resistance and so forth. Also, its resistance windings, which have been wound around a base plate, are apt to experience disconnection not only at the corners of the base plate but also at the sliding portion of the lever contact. In addition, there is a possibility that vertical movement of the float may simultaneously accompany horizontal movement thereof according to an inclination of the fuel level, which possibly results in occurrence of friction at the arm pivot point, so that the smooth movement of the float arm is impeded.

Moreover, since the float arm type variable resistance unit is designed to detect the vertical change of the fuel level by converting it into the rotational movement of the float arm, its response is non-linear and its detection accuracy is lowered particularly in the neighborhood of the empty level, which therefore necessitates provision of the residual quantity warning detector 26 attached to the supporting rod 27. Further, as is seen from FIG. 9, the structure of the contact has a number of parts including the contact lever 24, a conductive spring 30, a contact base 31, nuts for retaining those elements and the like. Furthermore, an automobile fuel tank bottom plate tends to bend by the weight of a fuel when its quantity is large and as the fuel is decreased the bottom plate restores its original shape. In addition, even a slight difference in pressure between inside and outside the fuel tank may give rise to the bending of the fuel tank. Since such bending causes the fuel level to go up and down, the unit which has been mounted from the upper portion of the tank needs, as noted above, several parts such as the wheel 28, the supporting rod 27, the spring means, the residual quantity warning detector 28 and others. The fact that the number of the parts used is relatively large results in an increased cost of the unit.

Besides, the float arm type variable resistance unit has, as shown in FIG. 8, a complicatedly branched off configuration as a whole and has to be inserted through a mounting hole of the tank when installed within the tank. This leads to a bad workability in the assembling operation.

Further, in the manufacture of recent automobiles, with changes in body form according to their increased compactness, aerodynamic designs and others, shapes and spaces of their trunk rooms and relative position between spare tire holding means and fuel tank have been subjected to diversificaton thereof. Therefore, fuel tank shapes also have the tendency of being made more complicated and diversified. As regards to the interior of the fuel tank as well, there exists a demand for the degree of freedom when designing baffle plates which divide the interior into small chambers for preventing sudden flow movement of the fuel within the tank when running, for protecting the float of a fuel gauge and reducing sounds caused by fuel movement and also for reinforcing outer tank walls upon occasion. Besides, when installing a fuel pump within the fuel tank, it becomes necessary to obtain a space for it. Considering a trend of such complication and diversification of the fuel tank in its shape and internal structure, a wide operation range, as seen from FIG. 10, for the float and arm of the conventional float arm type resistance unit has been a problem in design.

Further, the conventional residual quantity warning detector is extremely disadvantageous in that it works only to light a warning lamp when the residual quantity has decreased below the level of a predetermined quantity and is not intended for informing the driver of a subsequent fuel quantity which continues to decrease after the initial lighting of the warning lamp thus making the driver unnecessarily uneasy. OBJECT AND SUMMARY OF THE INVENTION The present invention has been thought out in the light of the points in question discussed above.

This invention, therefore, has for its object to provide a fuel level detector for an automobile fuel tank to simplify its assembly and mounting, to improve its reliability as well as its economical efficiency, and also to enhance its degree of freedom in designing.

The fuel level detector for an automobile fuel tank according to the present invention comprises a strut vertically provided within the fuel tank, a float slidably fitted in the strut and having a permanent magnet, a plurality of magnetic induction type reed switches slantedly disposed along the strut with adequate distance kept between the respective adjacent switches, the length of which distance being defined such that the permanent magnet of the float always actuates two adjacent reed switches simultaneously, a plurality of resistances respectively connected to the plurality of reed switches for changing the current values according to the reed switches which have been actuated, a residual quantity warning means having an element of a luminous body that is in connection between a ground and a predetermined reed switch among the plurality of reed switches, and a distance retention mechanism for keeping constant a distance between the predetermined reed switch and the bottom surface of the fuel tank, the mechanism comprising a guide mounted to a base member for vertically guiding the strut and a spring mounted between the base member and the strut for urging the strut towards the fuel tank bottom surface.

DETAILED DESCRIPTION OF PREFERRED EMBODIMENT

Now, one embodiment of the present invention will be more particularly described, by way of example, with reference to FIG. 1 to FIG. 4 of the accompanying drawings.

Figure 1:
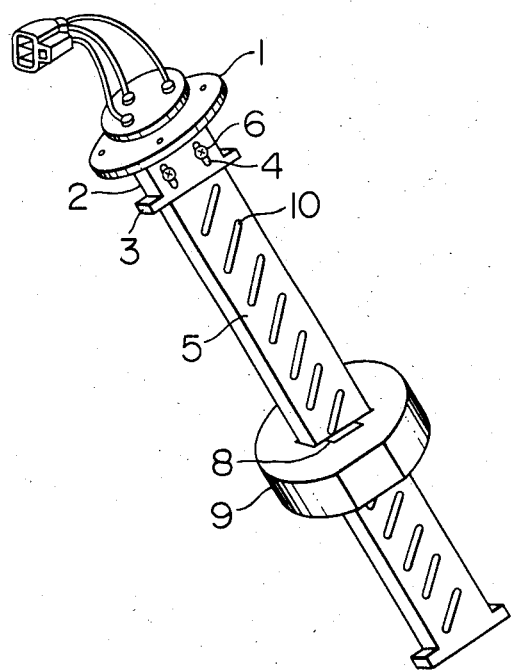
FIG. 1 is a perspective view of a fuel level detector for an automobile fuel tank according to the present invention.
Figure 2:
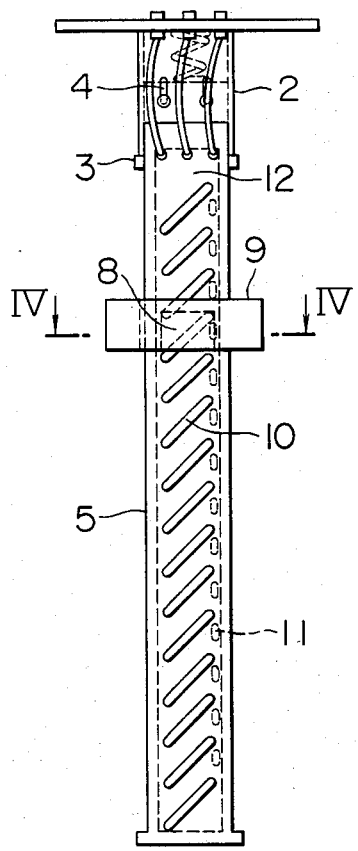
FIG. 2 is a front elevation of the invention fuel level detector of which a mounting base has been omitted.
Figure 3:
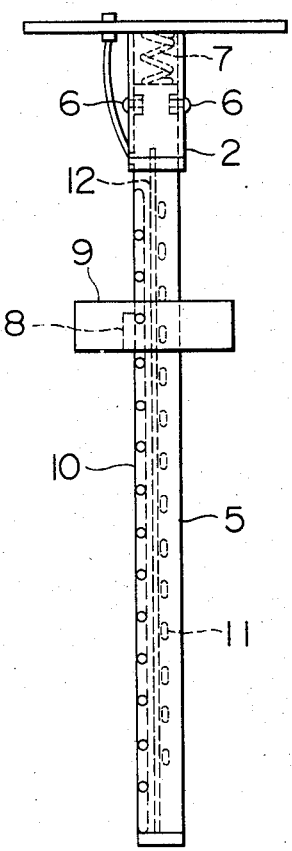
FIG. 3 is a side elevation of the invention fuel level detector of which a mounting base has been omitted.
Figure 4:
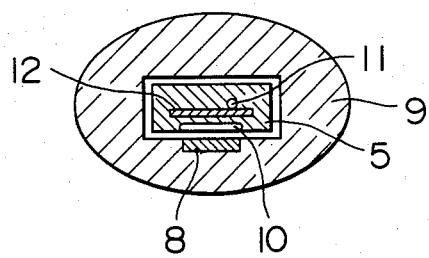
FIG. 4 is a sectional view taken along the line IV—IV of FIG. 2.
Figure 5:
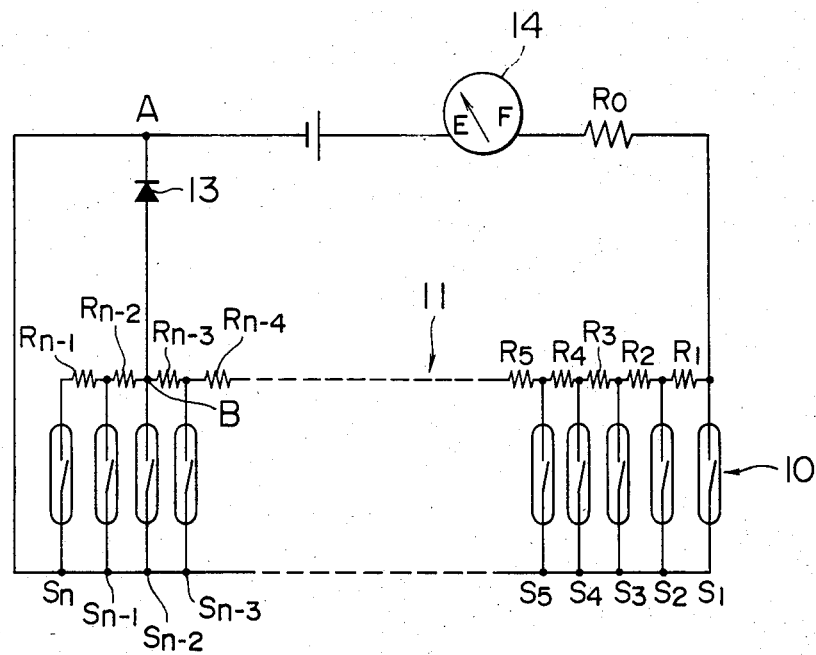
FIG. 5 is an electric circuit diagram for use in the invention fuel level detector.
Figure 6:
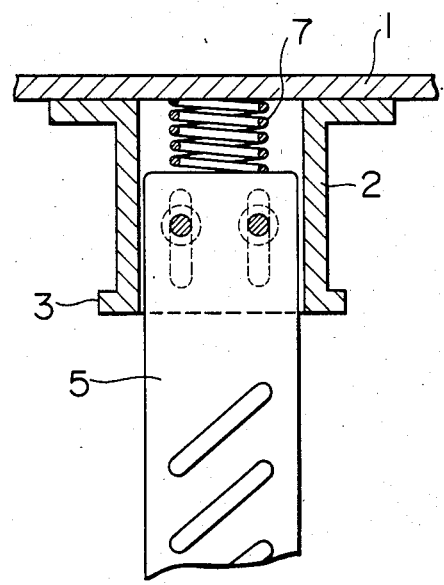
FIG. 6 is a partially sectional view which depicts a guide and a portion of a strut for the invention fuel detector.

Reference numeral 1 denotes a mounting base which is fixed to a fuel tank and reference numeral 2 denotes a guide which is rigidly secured to the mounting base 1 on the under side thereof. The guide 2 is a cylindrical body and rectangular in section and has stoppers 3 projectingly provided on the opposite side of the side fixedly connected to the mounting base. The guide 2, further, is formed with a pair of elongated slots 4 in both its mutually opposing surfaces. In the guide 2 is inserted a strut 5 so as to be capable of upward and downward movements after being vertically disposed within the fuel tank, said strut having therethrough internally threaded portions which respectively correspond to said elongated slots 4 and appropriate bolts 6 extend through the slots 4 and are in threaded engagement with said internally threaded portions of the strut. Further, within the guide 2, there is interposed a compression spring 7 (see FIG. 3 and 6) between the part of the mounting base and the extremity of the strut 5 and the spring 7 urges the strut 5 downwards. Around the strut 5 is loosely fitted a float 9 having therein a permanent magnet 8 and capable of upward and downward movements thereof in response to fuel level change within the fuel tank. The strut 5 is made of a non-magnetic material and has arranged thereon a plurality of reed switches 10 which are inclined relative to the longitudinal direction of the strut and are mutually spaced apart with an adequate distance, said reed switches being of magnetic induction type. Further, corresponding to said reed switches 10, a plurality of resistances 11 are arranged on a base plate 12 that is mounted to the strut 5 (FIG. 5). In this embodiment, the plurality of reed switches 10 are of an anti-explosion type and their contact portions are tightly sealed in glass tubes together with an inactive gas. The distance between adjacent switches 10 in longitudinal direction of the strut 5 is established so that the permanent magnet 8 of the float 9 always simultaneously adjacent two adjacent reed switches but at the lowest end of the strut 5, it actuates the reed switch $S_n$ only. As is seen in FIG. 5, the reed switches 10 are respectively connected to the plurality of resistances 11. When the uppermost reed switch $S_1$ and the subsequent reed switch $S_2$ are actuated, the whole circuit resistance is equal to $R_0$, then when the switch $S_2$ and the switch $S_3$ are actuated, the resistance becomes $R_0 + R_1$, and then when the switch $S_3$ and the switch $S_4$ are actuated, the resistance becomes $R_0 + R_1 + R_2$. As will be understood, this circuit is constructed such that as the position at which the switch is actuated varies successively, the whole circuit resistance varies accordingly.

Besides, a light emitting diode 13 is connected between a ground and the reed switch $S_{n-2}$ which lies in the neighborhood of the empty level (that is, between A and B in FIG. 5). A fuel gauge is shown at 14.

The operation of the invention fuel detector will be explained below.

Figure 7:
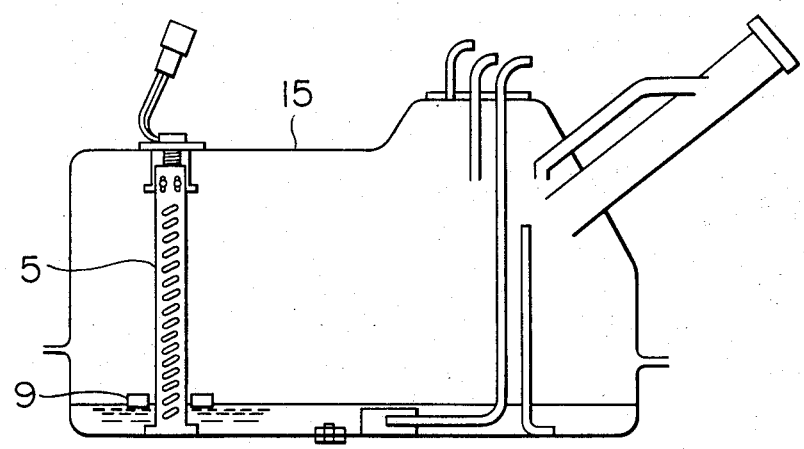
FIG. 7 is a sectional view showing the state of the invention fuel detector which has been mounted within a fuel tank.
Figure 8:
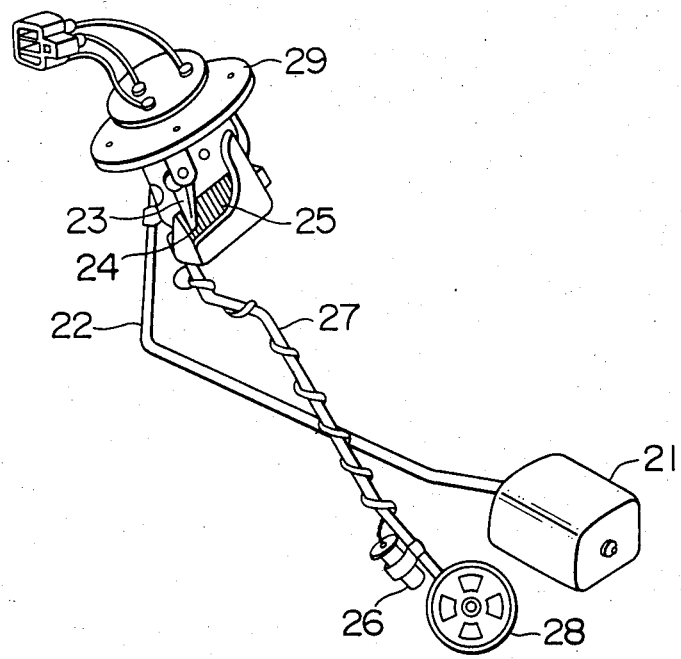
FIG. 8 is a perspective view of a float arm type variable resistance fuel detector according to the prior art.
Figure 9:
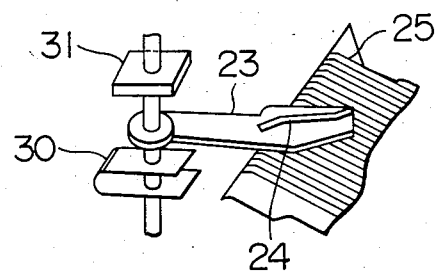
FIG. 9 is a fractional perspective view illustration the sliding contact portion of a float arm type variable resistance fuel detector according to the prior art.
Figure 10:
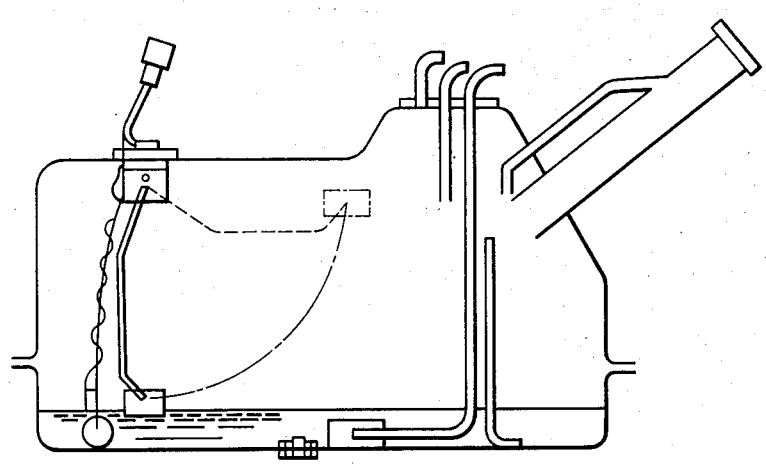
FIG. 10 is a sectional view showing the state of the float arm type variable resistance fuel detector according to the prior art when it has been installed in a fuel tank.

In the fuel detector of the present invention, as shown in FIG. 7, its strut is vertically mounted to a fuel tank 15 so as to abut against the bottom surface of the tank and is kept urged against said fuel tank bottom surface by the coiled compression spring 7 mounted between said strut 5 and the mounting base 1. In response to the fuel level change, the float 9 goes up and down along the strut 5 and the permanent magnet 8 moves as well. The permanent magnet attracts the magnetic induction type reed switches 11 and the switches are actuated. When the reed switches $S_1$ and $S_2$ are actuated, the total circuit resistance becomes $R_0$ and then when the reed switches $S_2$ and $S_3$ are actuated, the total resistance becomes $R_0 + R_1$. When the lowest reed switch $S_n$ is actuated, that is when the float 9 abuts against the stopper on the lower end of the strut, which occurs on arrival of the residual quantity of the fuel at the empty level, the total circuit resistance becomes $R_0 + ... + R_{n-2} + R_{n-1}$. Thus, as the position is varied at which the reed switch is actuated in response to the change of the fuel level, the total circuit resistance increases accordingly and the electric current flowing through the circuit decreases as well. By feeding this electric current to the fuel gauge, the quantity of the fuel remaining within the fuel tank can be measured.

Since the light emitting diode 13 is connected between the ground and the reed switch $S_{n-2}$ (between A and B in FIG. 5) in the neighborhood of the empty level, when the reed switches $S_{n-1}$ and $S_n$ are actuated, a potential difference corresponding to the resistance $R_{n-2}$ occurs between the A and B, so that the light emitting diode 13, that is, a warning lamp is caused to light. Then, when the lowest reed switch $S_n$ is actuated by further decrease in the fuel within the fuel tank, another potential difference corresponding to the resistance $R_{n-2} + R_{n-1}$ occurs between the A and B thereby causing the light emitting diode 13 brighter. By this, the driver can be informed of a subsequent change of the fuel quantity within the tank after the initial lighting of the warning lamp.

Because the strut 5 is always kept urged against the bottom surface of the fuel tank 15 as mentioned above, a distance between the tank bottom surface and the reed switch $S_{n-2}$ to which the light emitting diode 13 is connected is always kept constant, so that if the bottom surface was subjected to deformation, the warning lamp can be always lit at a constant quantity of the fuel which has been left in the tank.

In the preferred embodiment shown, because the switches are the anti-explosion type reed switch which the contact portion thereof is tightly sealed in the glass tubes with the inactive gas and the permanent magnet capable of attracting and actuating the reed switch is used, the switches are protected from possible environmental influences and further sliding type contact portions which are in use in related arts can be eliminated. In addition to this, even if an excess current should flow, there is no danger of causing a fire. Although, in the conventional float arm type variable resistance unit, the fuel level detector and residual quantity warning unit are provided respectively at two separate arms, in the embodiment shown they are arranged within the single strut and also configurationally simplified, so that the number of assembling processes can be lessened and the space occupied by the float in the tank can be made smaller because of the float moving only vertically upwards and downwards, so that the degree of freedom in design such as the designing of fuel tank configurations and location of a fuel pump, etc., can be obtained.

As has been disclosed above, thanks to a new construction in which the single strut has slantedly associated therein fuel level detection switches, i.e., reed switches and residual quantity warning switches and the switches are actuated by the float incorporating therein a magnet and capable of smooth movements relative to the strut and the distance between the residual warning switch and the tank bottom surface is kept constant by the coiled compression spring thus not only satisfying functions essential to the fuel level detector but also rendering the construction simplified and smaller, this invention can realize improvements in workability, reliability and economic efficiency in the assembling and mounting as well as enhancement of the degree of freedom in designing a fuel tank.

What is claimed is:

1. A fuel level dectector for an automobile fuel tank comprising a struct vertically provided with the fuel tank, a float slidably fitted around the strut and having a permanent magnet therein, a plurality of magnetic induction type reed switches disposed along the strut and inclined relative thereto, the distance between the adjacent switches being such that the permanent magnet of said float always actuates two adjacent reed switches simultaneously, a plurality of resistances each respectively connected to said plurality of reed switches for changing current value according to said reed switches which are actuated, a residual quantity warning means comprising a light emitting body connected between a ground and a predetermined reed switch and the respective resistance among the plurality of reed switches for changing the brightness thereof as said float falls below said predetermined reed switch, and a distance retention mechanism for keeping constant a distance between said predetermined reed switch and the bottom surface of the fuel tank, said mechanism comprising a guide mounted to a base member for vertically guiding the strut and a spring mounted between the base member and the strut for urging the strut towards the bottom surface of the fuel tank.

2. A fuel level detector as claimed in claim 1, wherein said reed switches are anti-explosion type reed switches of which the contact portions are sealedly received in glass tubes together with an inactive gas.

3. A fuel level detector as claimed in claim 2, wherein the float comprises an annular body surrounding the strut and the permanent magnet comprises a plate-like element carried by the float on one side thereof and in proximity to the reed switches.

4. A fuel level detector as claimed in claim 1, wherein the float comprises an annular body surrounding the strut and the permanent magnet comprises a plate-like element carried by the float on one side thereof and in proximity to the reed switches.

* * * * *